United States Patent
Quessette et al.

(10) Patent No.: US 8,956,680 B2
(45) Date of Patent: Feb. 17, 2015

(54) NATURAL STABILISER SYSTEM FOR FROZEN DESSERT

(75) Inventors: Maylis Quessette, Cessy (FR); Karl Wilhelm Silberzahn, Mainz (DE)

(73) Assignee: Nestec S.A., Vevey (CH)

( * ) Notice: Subject to any disclaimer, the term of this patent is extended or adjusted under 35 U.S.C. 154(b) by 528 days.

(21) Appl. No.: 12/671,412

(22) PCT Filed: Jul. 3, 2008

(86) PCT No.: PCT/EP2008/058560
§ 371 (c)(1),
(2), (4) Date: Jan. 29, 2010

(87) PCT Pub. No.: WO2009/019088
PCT Pub. Date: Feb. 12, 2009

(65) Prior Publication Data
US 2010/0203202 A1  Aug. 12, 2010

(30) Foreign Application Priority Data
Aug. 3, 2007  (EP) .................................... 07113805

(51) Int. Cl.
*A23L 3/00* (2006.01)
*A23L 1/00* (2006.01)
*A23G 9/00* (2006.01)
*A23G 9/34* (2006.01)
*A23G 9/32* (2006.01)
*A23G 9/42* (2006.01)

(52) U.S. Cl.
CPC .. *A23G 9/34* (2013.01); *A23G 9/32* (2013.01); *A23G 9/42* (2013.01)
USPC ........... 426/654; 426/519; 426/521; 426/522; 426/564; 426/614; 426/616; 426/661

(58) Field of Classification Search
USPC ......... 426/327, 393, 519, 520, 521, 522, 524, 426/564, 614, 615, 616, 654, 661
See application file for complete search history.

(56) References Cited

U.S. PATENT DOCUMENTS

| | | | | |
|---|---|---|---|---|
| 4,400,406 A | * | 8/1983 | Morley et al. ................. | 426/565 |
| 5,137,742 A | | 8/1992 | Bakal et al. | |
| 5,171,601 A | * | 12/1992 | Ioki et al. ...................... | 426/565 |
| 5,175,013 A | * | 12/1992 | Huang et al. .................. | 426/565 |
| 5,234,706 A | | 8/1993 | Slimak | |
| 6,395,314 B1 | | 5/2002 | Whalen et al. | |
| 2010/0209571 A1 | | 8/2010 | Vaghela et al. | |

FOREIGN PATENT DOCUMENTS

| | | | |
|---|---|---|---|
| CN | 1403008 A | 3/2003 | |
| EP | 0153870 A | 9/1985 | |
| EP | 0480665 A | 4/1992 | |
| EP | 0574907 | 12/1993 | |
| EP | 1180330 A | 2/2002 | |
| EP | 1400176 A | 3/2004 | |
| EP | 1563744 A | 8/2005 | |
| GB | 2359727 A | 9/2001 | |
| JP | 6209714 A | 8/1994 | |
| RU | 2266013 | 9/2003 | |
| RU | 2292154 | 9/2005 | |
| WO | WO9115517 A | 10/1991 | |
| WO | WO9213465 A | 8/1992 | |
| WO | 03015530 | 2/2003 | |
| WO | WO 03015530 A1 * | 2/2003 | ............... A23G 9/02 |
| WO | WO2005115163 A | 12/2005 | |
| WO | WO2006134584 A | 12/2006 | |

OTHER PUBLICATIONS

McCuin, Judith. Teach Yourself Visually Handspinning. 2007, p. 36.*
Radley, R.W. Industrial Uses of Starch and its Derivatives, Applied Science Publishers Ltd, 1976, pp. 255.*
L. Janvary, "Possible uses of functional ingredients in ice cream targeting the wellness market," European Dairy Magazine, 2006, pp. 28-30, XP008087307.
International Search Report for International Application No. PCT/US2008/058560 mailed Oct. 21, 2008.
Written Opinion of the International Searching Authority for International Application No. PCT/US2008/058560 mailed Oct. 21, 2008.

* cited by examiner

Primary Examiner — Leslie Wong
(74) Attorney, Agent, or Firm — K&L Gates LLP

(57) ABSTRACT

The present invention relates to stabilizer systems which may be used in the manufacture of frozen dessert which comprise native rice starch, egg yolk as a natural emulsifier and fibers from vegetables, fruits or mixtures thereof. It also relates to a method for manufacturing a frozen confectionery using a stabilizer system that contains only natural ingredients. The invention, in another aspect, also concerns the frozen confectionery products thus produced.

22 Claims, No Drawings

NATURAL STABILISER SYSTEM FOR FROZEN DESSERT

FIELD OF THE INVENTION

The present invention relates to stabiliser systems which may be used in the manufacture of frozen dessert which comprise native rice starch and fibres from vegetables, fruits or mixtures thereof. It also relates to a method for manufacturing a frozen confectionery using a stabiliser system that contains only natural ingredients. The invention, in another aspect, also concerns the frozen confectionery products thus produced.

BACKGROUND OF THE INVENTION

In the manufacture of frozen confectionery, stabilisers are generally used for functional purposes such as improvement of smoothness, prevention of ice crystal formation in storage, improvement of handling properties, while the use of emulsifiers results in smaller air cells which are evenly distributed in the product.

These ingredients are indispensable to the manufacture of commercially acceptable products. Efficient stabiliser/emulsifier systems already exist, but these are often chemically modified products. There is thus a need for providing systems which are more natural and efficient. There have been some efforts in this field.

For instance WO2005/115163 describes the use of vegetable fibres which are more effective to maintain the compactness and structural resistance of similar products that use stabilisers like guar, carob, alginates, carrageenan and others.

EP 1180330 A1 proposes to replace the traditional use of expensive stabilising agents without compromising the organoleptic properties of frozen confectionery. To this end, it is proposed a frozen confectionery comprising fat, a sweetening agent, milk solids non fat, water, starch such that the total amount of starch and milk solids non fat is between 2.5 and 18% and that the weight ratio of starch to milk solids non fat is between 0.03 and 1.5.

Starch, in particular rice starch and/or oat starch, is also present in the composition of WO92/13465 as a fat substitute in frozen desserts. The desserts are said to have an excellent texture, smoothness and mouth feel. Similarly, CN1403008 also discloses the use of rice starch as fat substitute and JP3209714 discloses the preparation of a liquid base for ice cream also comprising rice starch.

EP 1400176 A1 also describes frozen aerated products which have no additional stabilisers or emulsifiers and have an overrun of 10-250%, a pH, when melted, of 3.5 to 5.2, and which comprise 0-20% fat, 0.25 to 20% milk solids not fat, 0.05 to 1.5% soluble dietary fibre and 0.1 to 5% insoluble dietary fibres.

WO 9115517 relates to low-cost crude pectin-containing vegetable product prepared from agricultural waste products which can be useful as a stabilizer for frozen desserts. The raw material may be used directly as it is obtained from the fruit or vegetable processing plants. Especially preferred sources of raw materials for the product are citrus fruit peel, apple pomace and sugar beet pulp.

Stabiliser systems are widely available on the market. These generally include gums, esters of mono-, diglycerides, etc. and are thus mostly not considered as fully natural products.

GB 2359727 also describes an emulsifier composition which can be used in ice creams and which comprises an emulsifier which encapsulates a disintegration improver, such as a fibre or a hydrocolloid.

OBJECT OF THE INVENTION

There thus still remains a need to provide a stabiliser system which can be used in the manufacture of all natural frozen confectionery products. There is also a need for efficient stabiliser systems.

SUMMARY OF THE INVENTION

Accordingly, the present object is achieved by means of the features of the independent claims. The dependent claims develop further the central idea of the invention.

Accordingly, in a first aspect, the present invention provides a stabiliser system for use in frozen confectionery, characterised in that it comprises native rice starch, egg yolk as a natural emulsifier and fibres from vegetables, fruits or mixtures thereof.

The use of a stabiliser system according to any of claims 1 to 2 in the manufacture of frozen confectionery also forms part of the invention.

In a further aspect, a method for the manufacture of a frozen confectionery comprising the steps of:
a. Blending frozen confectionery ingredients with a stabiliser system comprising native rice starch, egg yolk as a natural emulsifier and fibres from vegetables, fruits or mixtures thereof,
b. Pasteurising and homogenising the mix,
c. Freezing the mix
as well as a product obtainable by said method are provided by the present invention.

In case fibres have not been expanded at an earlier stage, the homogenising stage is performed in at least one stage at a pressure of 150-250 bars, preferably 180-250 bars, more preferably 200-230 bars.

Finally, a frozen confectionery product characterised in that it comprises rice starch, egg yolk as a natural emulsifier and expanded fibres from vegetables, fruits or mixtures thereof is also encompassed by the present invention.

DETAILED DESCRIPTION OF THE INVENTION

The present invention concerns a stabiliser system for use in frozen confectionery. By "stabiliser system" is to be understood a mixture of ingredients, which contributes to the stability of the frozen product with respect to ice crystal formation, heat shock resistance, overall texture properties etc. Thus the stabiliser system may comprise any ingredients which are of structural importance to the frozen confectionery. This stabiliser system may thus comprise ingredients which render the texture creamier, or emulsifying ingredients, which overall contribute to the advantageous textural, structural, organoleptic properties of the product.

In the present description, by "natural ingredients" is meant ingredients of natural origin. These include ingredients which come directly from the field, the animals etc. They may also include ingredients which are the result of a physical or microbiological/enzymatic process (e.g. extraction, fermentation etc.). However, they do not include ingredients which are the result of a chemical modification process.

In the present invention, the stabiliser system is characterised in that it comprises native rice starch, egg yolk as a natural emulsifier and fibres from vegetables, fruits or a mixture thereof.

By fruit fibres is to be understood fibres obtainable by any fruit or mixtures of fruits. They may be provided in the form of pieces of the fruit itself, fruit extracts, fruit juice, fruit puree, fruit concentrate etc. Suitable fruits include apple, lemon, banana, blackberry, blackcurrant, blueberry, cherry, pomegranate, pumpkin, cranberry, gooseberry, grapes, guava, kiwi, mango, orange, papaya, passion fruit, peach, pear, pineapple, plums, raspberry, redcurrant, strawberry, tomato, etc.

By vegetable fibres is to be understood fibres obtainable by any plant source other than a fruit. These may include beans, Brussels sprouts, carrot, cauliflower, celery, onions, sugar beet, potato, cabbage, bamboo etc.

Preferably, the fibres used in the present invention are citrus fibres.

By native rice starch is meant rice starch which has not undergone any chemical or physical modifications.

Without wishing to be bound by theory, it is suspected that the combination of fibres from vegetables, fruits, or mixtures thereof and native rice starch is particularly effective as a stabiliser.

Additionally, native rice starch has been shown to give better results than other starches (e.g. tapioca starch or maize starch) in terms of global texture and creaminess.

Furthermore, the stabiliser system presents the advantage that it does not contain any artificial or unnatural components.

The stabiliser system further comprises egg yolk as a natural emulsifier.

By emulsifiers is meant compounds which confer to the finished product a smoother texture and stiffer body, which reduce the whipping time. The presence of emulsifiers results in air cells that are smaller and more evenly distributed throughout the internal structure of the ice cream.

In a preferred embodiment, the stabiliser system comprises native rice starch, citrus fibres and egg yolk only.

The stabiliser system of the invention may be used in the manufacture of frozen confectionery. For example, it may be used in the same way as traditional stabiliser/emulsifier systems in the manufacture of ice cream, mellorine etc. It presents not only the advantage of being particularly effective, but also the advantage that it contains only natural ingredients and can be used in green label, all natural frozen confectionery.

The invention further relates to a method for the manufacture of a frozen confectionery comprising, in a first stage, the step of blending frozen confectionery ingredients with a stabiliser system comprising native rice starch, egg yolk as a natural emulsifier and fibres from vegetables, fruits or mixtures thereof. In a preferred embodiment, the fibres in the stabiliser system are citrus fibres.

Frozen confectionery ingredients are typical ingredients such as any of fat, sugars, milk solids non-fat and combinations thereof. In an embodiment, fat is present in an amount of 5-20%, preferably 8-15%, more preferably 10-130.

Once the above ingredients are mixed, the mix is pasteurised under standard conditions. Pasteurisation is followed or preceded by homogenisation.

According to one embodiment, homogenisation is carried out in at least one stage at a pressure of 150-250 bars, preferably 180-250 bars, more preferably 200-230 bars. Preferably, the homogenisation is carried out in two stages, the first stage being at the pressures described above. The second stage is then carried out at pressures between 10-80 bars. The high pressure homogenisation allows activating the fibres to have them in an expanded form.

Expanded fibres are fibres which have undergone an "activation" step, for example by high energy processing of the fibres in a solvent. Such high energy processing may be high pressure homogenisation and/or high shear mixing. Thus, the three-dimensional structure of the fibres is modified in that the surface area of the fibres is increased.

In another embodiment, fibres are activated at an earlier stage, e.g. in water, and homogenisation can be carried out in standard conditions, namely at a pressure of between 40 and 200 bars, preferably between 100 and 150 bars, more preferably between 120 and 140 bars.

In a final step, the mix is frozen. The freezing step preferably is done in two steps: firstly, 10-60 minutes in a blast freezer at $-35°$ C. and then at least 2-3 hours at $-16°$ C.

Preferably, prior to freezing, the mix may be aged under standard conditions and packaged into containers of desired dimensions and hardened.

Optionally, the addition of flavourings, colourings, sauces, inclusions etc. may be carried out prior to the ageing step. If flavourings, colourings, sauces, inclusions etc. are added, these are selected from natural ingredients only.

In a preferred embodiment, the frozen confectionery is aerated to an overrun of 20-140%, preferably 20-80% and most preferably 30-60%.

The method of the invention thus lends itself to the manufacture of frozen confectionery which is all natural and does not contain any artificial ingredients, "E-numbers" etc. Furthermore, it is surprising that the high pressure homogenisation used in one embodiment of the present method to activate the fibres is compatible with the presence of native rice starch and, also optionally, the presence of high amounts of fat (up to 15%). Under standard manufacturing conditions, it would not be contemplated to combine high amounts of fat with the high homogenisation pressure. Furthermore, starch is normally sensitive to high pressures. However, the present invention has found that the present manufacturing conditions surprisingly produce stable products and products which have good creaminess properties.

The products obtainable by the present method also form part of the invention.

A further aspect of the invention relates to frozen confectionery comprising rice starch, egg yolk as a natural emulsifier and expanded fibres from vegetables, fruits or mixtures thereof.

Expanded fibres, i.e. fibres with higher surface area provide improved functionality and confer better thickening properties, freeze-thaw, heat and/or foam stability etc. to the compositions in which they are present.

Preferably, the expanded fibres present in the frozen confectionery are expanded citrus fibres.

The frozen confectionery may be an ice cream or a frozen dessert and have an overrun of 20 to 140%, preferably 20 to 80%, more preferably 30 to 60%.

In an embodiment, the fat content of the present frozen confectionery is 5-20%, preferably 8-15%, more preferably 10-13%, while in another embodiment, the fat content may be lower than 5%.

The rice starch is preferably present in an amount of 0.1-3%, preferably 0.2-2% of the frozen confectionery.

The fibres in the frozen confectionery may be present in an amount of 0.05-2%, preferably 0.1-0.8% of the frozen confectionery.

The frozen confectionery of the invention further comprises natural emulsifiers, in particular egg yolk. Egg yolk is preferably present in an amount comprised between 1.5% and 6% of the frozen confectionery.

The present confectionery are characterised in that they comprise only natural ingredients.

The present invention proposes a new way in which an "all natural" frozen confectionery which is stable and organoleptically acceptable by the consumer may be manufactured without resorting to artificial ingredients. Standard stabiliser/emulsifier systems which comprise "e-numbers" or chemically synthesised compounds are dispensed with, which provides a more appealing product to the consumer. Furthermore, organoleptic aspects such as creaminess are not compromised despite the high energy processing conditions, not normally used in frozen confectionery manufacture.

The present invention is illustrated further herein by the following non-limiting examples.

EXAMPLES

Example 1

An ice cream of the invention was manufactured under the following conditions:

Sugar, milk fat, Milk Solid Non Fat (MSNF), native rice starch, egg yolk and citrus fibres were blended with water using a high speed blender. The mix was then pasteurised under continuous pasteurisation using a High Temperature Short Time (HTST) heat exchanger in a large, insulated feed tank, with preheating to 30-40° C. Pasteurisation was carried out, followed by homogenisation in two stages, firstly at above 180 bars and, in the second stage, at 50 bars. Flavours, colourings, inclusions, sauces could be added to the mix. The mix was then aged for 6 hours at 3° C. before being packed in boxes. The ice cream was then hardened at −35° C., followed by −16° C. and then stored at −18° C.

Example 2

An ice cream recipe having an overrun between 20-80% according to the present invention is given below:

| Ingredients | Wt % of final product |
| --- | --- |
| Fat | 8-15 |
| Sugar | 17-24 |
| MSNF | 8-12 |
| Egg yolk | 1.5-6 |
| Rice starch | 0.2-1 |
| Citrus fibres | 0.1-0.6 |
| Total solids | 38-48 |

The invention claimed is:

1. A stabilizer system for use in frozen confectionery, the stabilizer system consisting of only natural ingredients consisting of native rice starch, egg yolk as a natural emulsifier and expanded citrus fibers.

2. A method of manufacturing a frozen confectionery, the method comprising using a stabilizer system in a frozen confectionery, the stabilizer system consisting of only natural ingredients consisting of native rice starch, egg yolk as a natural emulsifier and expanded fibers selected from the group consisting of vegetables, fruits and mixtures thereof, wherein the frozen confectionery also contains only natural ingredients.

3. A method for the manufacture of a frozen confectionery, the method comprising:
blending frozen confectionery ingredients with a stabilizer system consisting of only natural ingredients consisting of native rice starch, egg yolk as a natural emulsifier and expanded fibers selected from the group consisting of vegetables, fruits and mixtures thereof, to form a mix that contains only natural ingredients,
pasteurizing and homogenizing the mix, and
freezing the mix.

4. A method for the manufacture of a frozen confectionery, the method comprising:
blending frozen confectionery ingredients with a stabilizer system consisting of only natural ingredients consisting of native rice starch, egg yolk as a natural emulsifier and fibers selected from the group consisting of vegetables, fruits and mixtures thereof, to form a mix, wherein the frozen confectionary ingredients and the stabilizer system contains only natural ingredients,
pasteurizing and homogenizing the mix, wherein homogenizing is performed in a first stage at a pressure of 150-250 bars and in a second stage at a pressures between 10 and 80 bars, to expand the fibers, and
freezing the mix.

5. The method of claim 3, wherein the fibers are citrus fibers.

6. The method of claim 3, wherein the frozen confectionery ingredients include at least one ingredient selected from the group consisting of fat, sugars, milk-solids non-fat and combinations thereof.

7. The method of claim 6, wherein the fat is present in an amount of 10-13%.

8. The method of claim 3 comprising an additional ageing step and a packaging step prior to freezing the mix.

9. A frozen confectionery product comprising a stabilizer system consisting of only natural ingredients consisting of native rice starch, egg yolk as a natural emulsifier and expanded fibers selected from the group consisting of vegetables, fruits and mixtures thereof.

10. The frozen confectionery product of claim 9, wherein the fibers are citrus fibers.

11. The frozen confectionery product of claim 9, which is an ice cream.

12. The frozen confectionery product of claim 9, which has an overrun of 30 to 60%.

13. The frozen confectionery product of claim 9, which has a fat content of 10-13%.

14. The frozen confectionery product of claim 9, which has a fat content lower than 5%.

15. The frozen confectionery product of claim 9, which comprises rice starch in an amount of 0.2-2%, egg yolk in an amount of 1.5-6% and vegetable expanded fibers in an amount of 0.1-0.8% of the frozen product.

16. The frozen confectionery product of claim 9, which consists of the stabilizer system, fat, sugar and milk solids non-fat.

17. The method of claim 4, wherein the fibers are citrus fibers.

18. The method of claim 4, wherein the frozen confectionery ingredients include at least one ingredient selected from the group consisting of fat, sugars, milk-solids non-fat and combinations thereof.

19. The method of claim 18, wherein the fat is present in an amount of 8-15%.

20. The method of claim 4 comprising an additional ageing step and a packaging step prior to freezing the mix.

21. The method of claim 2, wherein the fibers are vegetable fibers obtained from a source selected from the group consisting of beans, Brussel sprouts, carrot, cauliflower, celery, onions, sugar beet, potato, cabbage, bamboo and combinations thereof.

22. The method of claim 2, further comprising activating the fibers in a solvent to form extended fibers before homogenizing a mix of the stabilizer system and the frozen confectionery, the homogenizing being performed at a pressure between 120 and 140 bars.

\* \* \* \* \*